United States Patent
Blue et al.

(10) Patent No.: US 9,364,981 B1
(45) Date of Patent: Jun. 14, 2016

(54) BRAID CAPTURE OVERMOLDING

(71) Applicants: William Blue, Middlefield, OH (US);
Thomas K'Meyer, Ravenna, OH (US)

(72) Inventors: William Blue, Middlefield, OH (US);
Thomas K'Meyer, Ravenna, OH (US)

(73) Assignee: Mercury Plastics, Inc., Middlefield, OH (US)

(*) Notice: Subject to any disclaimer, the term of this patent is extended or adjusted under 35 U.S.C. 154(b) by 601 days.

(21) Appl. No.: 13/633,620

(22) Filed: Oct. 2, 2012

Related U.S. Application Data

(62) Division of application No. 12/618,226, filed on Nov. 13, 2009, now Pat. No. 8,277,714.

(51) Int. Cl.
*B29C 45/14* (2006.01)

(52) U.S. Cl.
CPC ..... *B29C 45/14614* (2013.01); *B29C 45/14221* (2013.01)

(58) Field of Classification Search
None
See application file for complete search history.

(56) References Cited

U.S. PATENT DOCUMENTS

| | | | |
|---|---|---|---|
| 2,636,408 A | 3/1949 | Mitchell | |
| 3,263,520 A | 8/1966 | Tschanz | |
| 4,055,616 A | 10/1977 | Keen et al. | |
| 4,088,156 A | 5/1978 | Kubo et al. | |
| 4,159,027 A | 6/1979 | Caillet | |
| 4,415,389 A * | 11/1983 | Medford et al. | 156/91 |
| 4,724,111 A | 2/1988 | Iwata et al. | |
| 5,266,262 A | 11/1993 | Narayama et al. | |
| 5,320,389 A | 6/1994 | Dupont, Jr. | |
| 5,895,695 A * | 4/1999 | Rowley | 428/36.9 |
| 6,123,111 A * | 9/2000 | Nathan et al. | 138/109 |
| 6,379,596 B1 | 4/2002 | Warburton-Pitt | |
| 6,773,645 B2 | 8/2004 | Kondou | |
| 6,971,414 B2 * | 12/2005 | Vohrer | 138/109 |
| 8,491,014 B2 * | 7/2013 | Folcarelli et al. | 285/286.1 |
| 2006/0170134 A1 * | 8/2006 | Rowley | B29B 13/025 264/265 |
| 2008/0221469 A1 * | 9/2008 | Shevchuk | 600/532 |

* cited by examiner

*Primary Examiner* — Edmund Lee
(74) *Attorney, Agent, or Firm* — Hahn Loeser & Parks, LLP

(57) ABSTRACT

The invention described herein relates to capturing a covering such as a braid on a exterior profile of a plastic tube by overmolding onto a plumbing tube, wherein a circumferentially surrounding covering or braid is modified prior to the overmolding process.

18 Claims, 5 Drawing Sheets

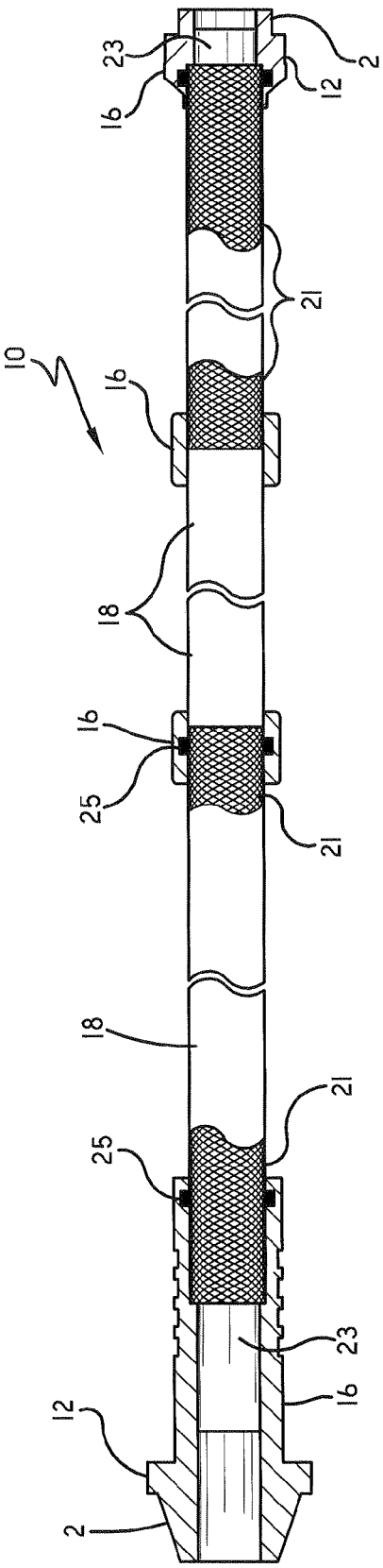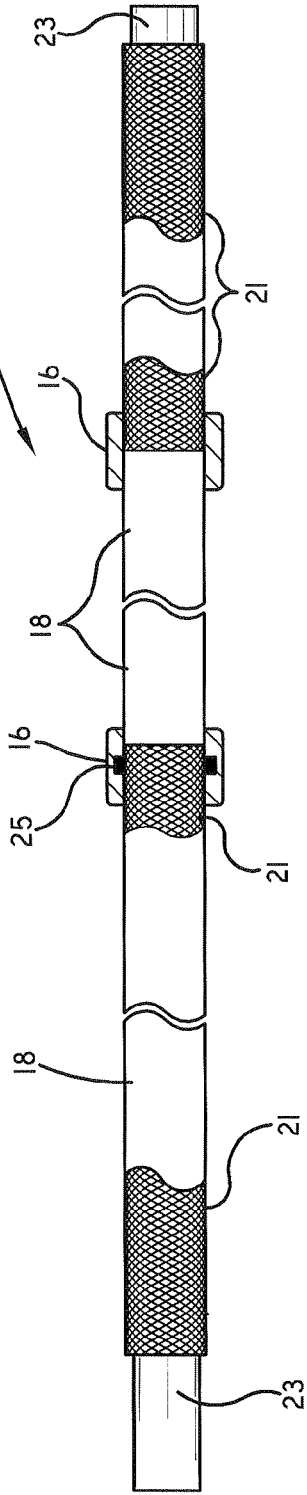
FIG. 4A
FIG. 4B

BRAID CAPTURE OVERMOLDING

RELATED APPLICATIONS

This application relates to U.S. patent application Ser. No. 12/618,226, filed Nov. 13, 2009, now U.S. Pat. No. 8,277,714.

TECHNICAL FIELD

The invention relates generally to a leak-proof method for securing a covering such as a braid onto the exterior of a tube (or other profile shape) by overmolding. The overmolding methodology is applicable to capturing the outer covering about either end of a tube (or profile) as well as at non-end locations.

BACKGROUND OF THE INVENTION

There are two main choices in plumbing installations: copper tube and plastic tube. For the professional plumber, the operations of soldering and welding of copper pipes and fittings are all integral components of his professional training. For the do-it-yourselfer, these skills are typically less developed, if present at all, and hence one of the reasons for the development of plastic-based tubing installations.

However, with the increased use of plastic plumbing components, comes the inherent risk of abrasions and cuts which compromise the integrity of the plastic tube, and which potentially become a point of failure, which is highly undesirable to any homeowner as well as to any manufacturer of the installed product. One solution is to position an outer covering, such as a protective braid, over the plastic tube or profile so that during installation, cuts or abrasions will only impact the braid, and not the underlying tube or profile.

However, while the positioning of a braid is a solution to the premature failure problem, the ability to have the braid securely fastened to the tube remains a problem even with the use of a mechanical fastening system, e.g., hose clamps, which are unsightly and add significant bulk to the attachment point thereby making it impossible to thread such tubing through drilled holes within the studs of walls or appliances. Additionally, depending on the composition of the braid covering, the braid may "wick" liquid underneath traditional overmolds, thereby leading to a slow leak.

There is a need for a better fastening system which captures and secures the outer covering about a plumbing tube or profile in a leak-proof manner.

SUMMARY OF THE INVENTION

In accordance with one aspect of the invention, there is provided an overmolding method by which an outer covering, such as a braided material, which has been affixed about at least a portion of a tube or profile is captured and secured to the tube or profile. The overmolding can occur at either end of the tube, both ends of the tube, or at a non-end position or positions, i.e., at any location between the ends or at multiple locations between the ends.

In order to promote sufficient material-to-material bonding at end locations between the overmold and the extruded plastic tube, a portion of the outer covering is pared back a sufficient distance along the plastic tube in order to provide a bonding region prior to commencing the overmolding process, thereby insuring leak-proof engagement. In an alternate embodiment, the outer sheath may have a length that is less than the length of the tube in order to expose a portion of the underlying tube, and thereby facilitate the material-to-material bond between the plastic tube and the overmolded component.

In another aspect of the invention, the overmolded component has a linear or non-linear geometric shape, e.g., a sealing shape, such as a nose cone of a first rigidity which is overmolded onto at least one end of the braided plastic tube of a second rigidity, where and wherein the relationship between the first rigidity and second rigidity may be the same or different. When the rigidity is different, the relationship between the first and second rigidity can be either that the first rigidity is more flexible than the second rigidity or vice versa. One of the keys to controlling the rigidity of the respective components is the density of polymeric composition and/or the degree of crosslinking of each component of the part. Typically, and especially with polyethylene, the higher the density of the polymer, the more rigid the component. By controlling the density and/or optionally the degree of crosslinking of the polymer, it is possible to custom tailor the characteristics of the tube and the overmolded component. As used in this application, crosslinking is optional, although generally preferred when the overmold operation is performed at an end location or when the end-use application involves the transporting of hot liquids or gases.

In another embodiment of this invention, the rigidity of the tube and the overmolded component are essentially the same, with the overmolding occurring when the tube and overmolded component are either non-crosslinked or crosslinked to a limited degree, followed by a continuation of the crosslinking process to a second higher degree of crosslinking. In this embodiment, the polymeric materials of the overmolding and the extruded tube may be miscible. The miscibility of the polymeric materials aid in promoting the material-to-material bond between the molded and extruded surfaces.

In one embodiment, a process is described for securing a covering about a profile, the profile having a first and a second end, including the steps of: cutting a length of the profile and the covering, the covering co-extending along said length of said profile and positioned about the profile; removing at least a portion of the covering from at least one first end of the profile so as to expose at least a portion of the profile thereby creating a first bonding region; and overmolding a thermoplastic polymer about a complete peripheral perimeter of the first bonding region of the profile that is chemically compatible with the profile so as to form a material-to-material leak-proof bond between the overmolded polymer and the profile and about at least a portion of a peripheral perimeter of said covering.

In one aspect of the invention where the covering and overmolded thermoplastic polymer are only partially chemically compatible, the process further comprises the steps of inserting a supplemental fastening means about an end of said covering; applying an inward compressive force to said supplemental fastening means; and wherein the step of overmolding includes overmolding at least a portion onto the supplemental fastening means.

In one embodiment the process includes the step of overmolding which produces a sealing means wherein the overmolded thermoplastic polymer and the profile's bonding region and the covering are all chemically compatible. In a preferred embodiment the profile is circular and the step of overmolding produces a sealing end. The sealing end comprises a sealing surface. In a more preferred embodiment the process includes the step of crosslinking after the step of overmolding.

The process may optionally include repeating the steps previously described on an opposed end of the profile.

The process is not limited to overmolding at end locations and includes a process for securing a covering about a profile, said profile having a first and a second end, comprising the steps of: cutting a length of the profile; positioning a covering about said profile (the covering only co-extending partway along said length of the profile and a distance from the first end of the profile creating a first bonding region); overmolding a first thermoplastic polymer about a complete peripheral perimeter of the first bonding region of the profile that is chemically compatible with said profile so as to form a material-to-material leak-proof bond between the overmolded polymer and the profile; and overmolding a second thermoplastic polymer about at least a portion of a peripheral perimeter of the covering co-extending partway along the length of said profile.

In one embodiment the first and second thermoplastic polymers are the same while in another embodiment the first and second thermoplastic polymers are different.

In another aspect of the invention, a process for securing a braid about a profile is described, (said profile having a first and a second end) comprising the steps of: cutting a length of said profile; positioning a braid about said profile (said braid having a first end and a second end); removing at least a portion of said braid from at least one first end of said profile so as to expose at least a portion of said profile thereby creating a first bonding region having a first bonding region; applying heat to either the first end or second end of said braid adjacent to the first bonding region; overmolding a first thermoplastic polymer about a complete peripheral perimeter of said first bonding region of said profile that is chemically compatible with said profile so as to form a material-to-material leak-proof bond between said overmolded polymer and said profile; and overmolding a second thermoplastic polymer about at least a portion of a peripheral perimeter of said covering co-extending partway along said length of said profile.

These and other objects of this invention will be evident when viewed in light of the drawings, detailed description and appended claims.

BRIEF DESCRIPTION OF THE DRAWINGS

FIGS. 1A and 4B are perspective views of the profile and covering wherein FIG. 1A illustrates a partial length of cut profile in which the covering extends to an end of the profile and wherein

FIG. 4A is a partial cross-section view showing the profile with braiding affixed to the profile at various locations along the length of the profile;

FIG. 4B is a partial cross-section view showing the profile without overmolded components and with braiding affixed to the profile at non-end locations along the profile;

DETAILED DESCRIPTION OF THE DRAWINGS

Figure 1A:
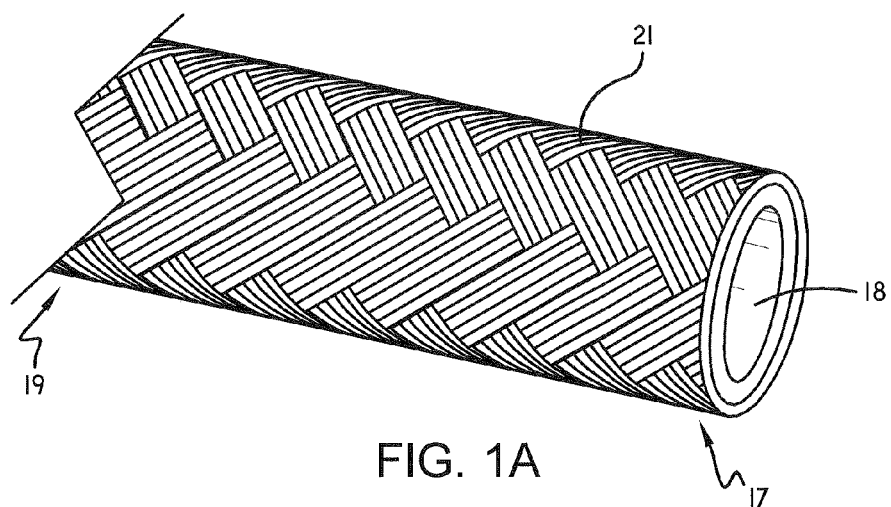

Referring now to the drawings wherein the showings are for purposes of illustrating the preferred embodiment of the invention only and not for purposes of limiting the same, the Figures show lengths of plastic tubing, also referred to as lengths of profile, at least a portion of which has a covering and overmolded components as well as the process used to achieve such a product.

As used in this application, the term "tube" and "tubing" is meant to encompass all conduit profiles in cross-section, whether the conduit is used for gaseous transport or liquid transport. The term "braid" is meant to encompass all types of braiding which is employed throughout particularly the plumbing industry, and encompasses braid material, the composition of which includes plastic, cloth, fiberglass, metal (preferably stainless steel), etc. Also, as used in this application, the term "chemically compatible" means that the composition of the overmolded polymer and underlying profile will be such that the two polymers are capable of at least some melt fusion, thereby maximizing the leak-proof characteristics of the interface between the plastic conduit profile and overmolded plastic. There are several means by which this may be achieved. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit profile and the interior region of the overmolded polymer. Another manner in which to state this would be to indicate that at least a portion of the polymer compositions of the plastic conduit and the overmolded polymer are miscible.

In the practice of this invention, it is important that chemical compatibility is achieved between the overmolding polymer and the bonding region of the underlying polymer profile. It is less important, although desirable, that chemical compatibility be present between the overmolding polymer and the composition of the covering or braid. When there is no chemical compatibility between the overmolding polymer and the covering or braid, supplemental fastening means, such as discussed herein are required (e.g., when metallic braids are employed as a covering).

Figure 1B:
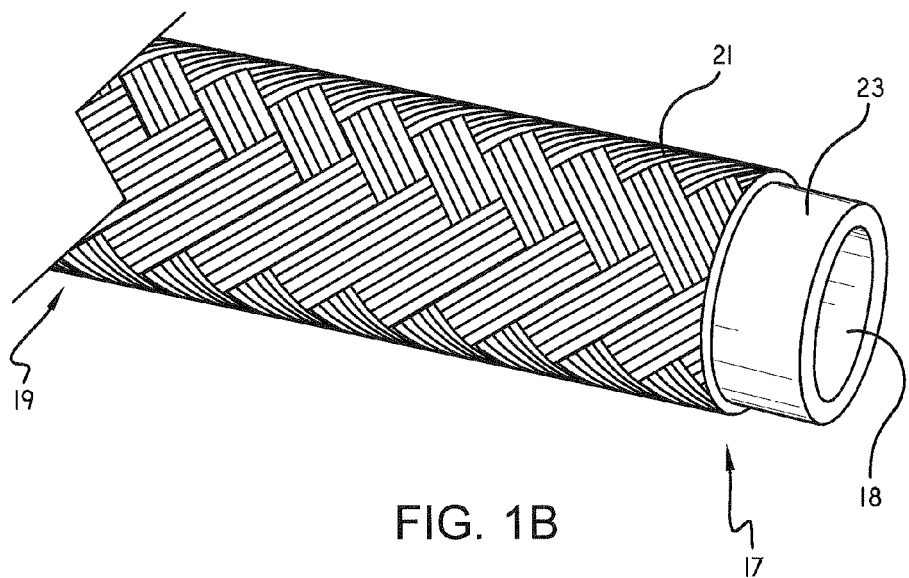
FIG. 1B illustrates profile of FIG. 1A in which a portion of the covering has been removed from the end to facilitate the formation of a leak-proof fitting during the overmolding process.

In one embodiment of the invention as shown in FIGS. 1A-1B, tube assembly 10 has a generally elongate profile or tube 18 with a proximal end 13 and a distal end 15. Profile 18 has a covering 21 with a proximal end 17 and a distal end 19. Covering 21 extends substantially the entire length of generally elongate profile 18. In one embodiment of the invention, covering 21 is comprised of materials including plastic materials, fiberglass, nylon webbing, cloth materials such as cotton or polyester as well as combinations thereof. In another embodiment, covering 21 is constructed from metal. While covering 21 shown in FIGS. 1A-1B is a multi-strand braid, there is no need to limit the invention to such and a single-strand braid, plastic tube sheaths, or other coverings are within the scope of this invention. In one aspect of the invention, covering 21 may be a polymeric sleeve that is applied and covers at least a portion of the plastic tube, but does not extend so as to be coterminal with the proximal end of the tube. In another embodiment of the invention, the underlying profile 18 is corrugated, as may be achieved via extrusion in which the extruded material exits the die at a non-linear rate, thereby forming corrugations prior to the addition of the braid or a polymeric sleeve. Alternatively, corrugated polymer profiles may be obtained by practicing air-core molding, involving heating a profile and inserting the profile into a heated split die, sealing or closing one end of the profile, followed by insertion of a source of pressurized gas at the opposed end of the profile, closing the die and pressurizing the profile so as to fill the internal voids of the die. Additional details may be found in U.S. Pat. Nos. 6,838,041 and 6,485,666. Additionally, as illustrated later, while covering 21 may be a braid that is tightly wound, there is no need to limit the invention to such, but rather, includes any application where braiding (of whatever degree of tightness) is useful or applicable.

As shown in the Figures, profile 18 and covering 21 may have one or more overmolded components 16 on at least one end or both the proximal end and the distal end of profile 18. The overmolded components may be pipe connectors, plumbing connections, plumbing fittings, valve connectors or appliance connectors, but are not limited to any particular type or shape of fitting or connector.

In the practice of this invention, covering 21 is either pared back or removed from one or more, or both, of the ends to expose at least some underlying portion of profile as illustrated in FIGS. 1A-1B or in the instance when the sleeve material is inserted over the underlying tube, is positioned so as not to extend fully so as to be conterminous with the underlying tube or profile end(s). The exposure of the underlying polymeric material of profile 18 facilitates a material-to-material bond in the bonding region 23 with the overmolded component. The covering 21 is captured between the material-to-material bond with tube 18 and the overmolded component, thereby effecting a leak-proof engagement. In this embodiment, as illustrated in FIGS. 2, 3, 4A-4B, and 5 covering 21 may substantially span the entire length of profile 18, except for a portion of which is removed prior to the overmolding process near at least one of the tube ends. The portion of covering 21 which is pared back or removed provides a bonding region 23 on an outer surface of the underlying plastic tube to promote a material-to-material bond between the overmolded material and the exterior peripheral surface of the plastic tube. Covering 21 may also be pared back from an opposed end of the profile in order to provide a second bonding region 23 on the exterior surface of the profile to promote a material-to-material bond between the overmolded components and the exterior peripheral surface of profile.

In the embodiment where the covering is a plastic braid, an additional step in the invention process may be performed before the covering and profile undergo the overmolding process. In an additional step, heat is applied to at least one end of the covering to melt the strands of the braid together. Heat is also applied to melt the braid directly to the profile in order to hold the braid in position until the overmolded component is applied. After heat is applied to the braid, the process as described above is performed to remove a portion of covering in order to expose the profile of the tube. The process of applying heat to the braid ensures that any potential leak path through the area between the braid strands is removed. The potential leak path through the area between the braid strands is referred to as "wicking" of the braid. Wicking, also known as "capillary action," is the phenomenon of the movement of liquids in thin tubes or the flow of liquids through porous media, such as the flow of water through porous fabric. If the braid extended to the end of the tube, then the potential for wicking occurs, thereby causing fluid to flow along the fabric of the braid. This creates a path for fluid to flow outside of the tubing assembly, causing a leak to develop in the tubing assembly. The process as described above prevents wicking of the braid.

Figure 6:
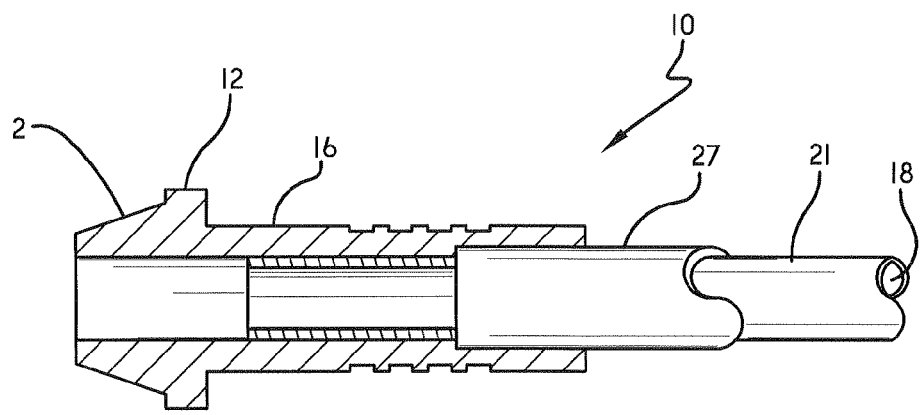
FIG. 6 is a partial cross-section view of another alternate embodiment of the covering in which the braid is a plastic sleeve.

In an alternate embodiment, as shown in FIG. 6 in order to facilitate the formation of a material-to-material bond, covering 21 may be shorter in length than the underlying plastic tube. The covering 21 should at least be a sufficient length in order to expose a portion of the underlying plastic tube to allow overmolding of polymeric materials onto the profile. The covering may be any length as long as covering length is less than the length of underlying tube 18 so that there is enough of the underlying plastic tubing exposed to allow overmolding of the overmolded components and formation of the leak-proof material-to-material bond.

FIG. 4A-4B illustrate embodiments wherein covering 21 is present in segments on tube 18. The covering is either pared back from each end or removed at various areas along tube 18. At the areas where covering 21 has been removed or pared back, portions of the tube may be overmolded onto the exposed underlying plastic tube. Covering 21 may be removed at any location along underlying plastic tube 18, for example, as better illustrated in FIG. 4B, wherein covering 21 is pared back or removed at non-end locations along the profile. It is understood that the invention is not limited to just one non-braided area, but may have as many braided/non-braided areas as required for the end-use application.

In certain applications when additional securing engagement is desired between the overmolded component and the braided material, e.g., where that area may undergo a higher amount of mechanical stress, or when the overmolded component and the braided material are chemically incompatible, or at least partially incompatible, it may be desirable to construct tubing assembly 10 with mechanical fastener 25 to aid in the securing of the outer covering, such as the braid. Mechanical fastener 25 may be, but is not limited to, a crimp ring, a clamp, or a snap or structural equivalents. Covering 21, tube 18 and overmolded component 16 may be attached through an additional physical bond with the mechanical fastener 25. As shown in FIG. 4, the mechanical fastener 25 may be fastened around the plastic tube. Mechanical fastener 25 contacts the overmolded portion and creates a physical bond in order to ensure securing engagement. In addition, the mechanical fastener 25 is not limited to this particular embodiment or placement along the length of tubing and may be placed at various locations along the profile.

Figure 5:
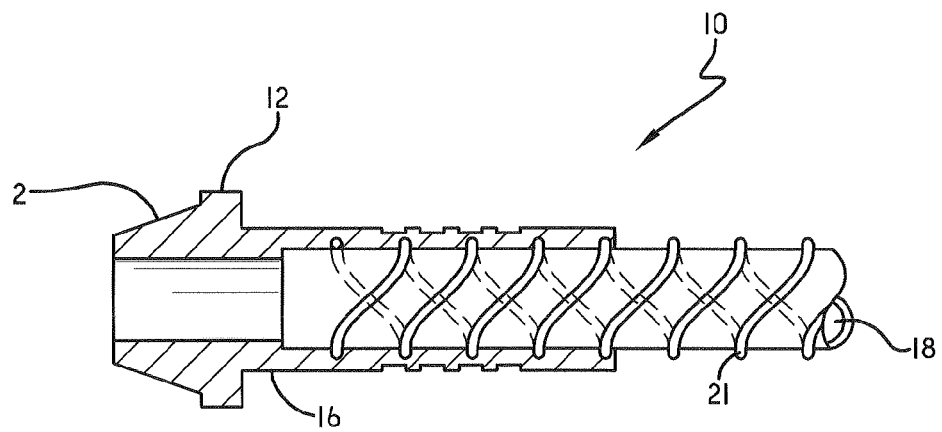
FIG. 5 is a partial cross-section view of an alternate embodiment of the covering in which the braid is less tightly wound about the profile.

In an alternate embodiment as shown by FIG. 5, covering 21 may be constructed from a braid that may be less tightly wound around the plastic tube. In this embodiment, the pitch of the braid may vary according to the desired application. As illustrated by FIG. 5, the braid is substantially large enough to allow the overmolding flowable polymer from a source into the mold via transfer conduit 60 (illustrated in FIG. 7) to access bonding region 23 of the outer surface of the plastic tube. This results in bonding of the overmold portion over and through the open-mesh braid onto the plastic tube. The polymeric material may extend through the interstitial areas of the braid to form button protrusions. The button protrusions may form additional material-to-material bonds with the end connector in order to ensure leak proof engagement. The button protrusions form additional bonds to prevent the end connector and the tubing assembly from separating.

In one aspect of the invention, overmolded component 16 may have a linear or non-linear geometric shape, e.g., a sealing shape, such as a nose cone of a first rigidity which is overmolded onto at least one end of the plastic tube of a second rigidity, where and wherein the relationship between the first rigidity and second rigidity may be the same or different. When the rigidity is different, the relationship between the first and second rigidity can be either that the first rigidity is more flexible than the second rigidity or vice versa. The difference in rigidity may cause the polymeric materials of the overmold and the extruded plastic tube to be non-miscible. In this situation, the use of mechanical fastener 25 ensures a physical connection of overmolded component 16 to the extruded plastic tube in order to form a leak proof seal.

In another embodiment of this invention, the rigidity of tube 18 and overmolded component 16 are essentially the same, with the overmolding occurring when tube 18 and overmolded component 16 are either non-crosslinked or crosslinked to a limited degree, followed by a continuation of the crosslinking process to a second higher degree of crosslinking. In this embodiment, the polymeric materials of the overmolding and extruded tube 18 may be miscible. Miscible polymers promote the material-to-material bond between the molded and extruded surfaces.

When the desired end use application requires the material-to-material bond between tube 18 and overmolded component 16, covering 21 is modified to remove a portion of covering 21 in order to expose bonding region 23. Prior to the overmolding process, as described above, it has been determined that in order to promote sufficient material-to-material bond between the overmolded geometry and the plastic tube, a portion of covering 21 is pared back a sufficient distance in order to provide bonding region 23 prior to commencing the overmolding process. The end of the plastic tube, which includes covering 21 over substantially the entire length of the plastic tube, is pared back a sufficient distance to produce bonding region 23 on one end, both ends, or at another location along the plastic tube. Machining of covering 21 to expose one or more material-to-material bonding regions, may be accomplished by known methods including, but not limited to, turning operations which rotate the plastic tube against a cutting tool such as a lathe; milling operations which a cutting tool rotates to bring cutting edges to bear against the outer covering of the plastic tube; and machines equipped with a laser or heat which are used for cutting and/or melting of covering 21.

After removing a portion of the covering as described above, an additional step of the process, heat may be applied to the covering 21 in order to seals the ends of the braid strands when the covering comprises a braided material. Heat is also applied to melt the braid directly to the profile in order to hold the braid in position until the overmolded component 16 is applied. After heat is applied to the braid, the process as described above is performed to remove a portion of covering in order to expose the profile of the tube. The process of applying heat to the braid ensures that any potential leak path through the area between the braid strands is removed.

In an alternate embodiment as shown in FIG. 6, covering may comprise a substantially continuous sheath layer 27 of the same or another polymeric material. The polymeric material may preferably be an extruded thermoplastic or melt processable elastomeric material through which the outer covering portion and tube portion may or may not remain visible. When the application requires the application of a coating layer, covering 21 may be of alternate configurations. In a first configuration, covering 21 may be a loose braid where the underlying polymer may flow through the interstitial areas of the braid to form buttons that protrude upward. The buttons may form a chemical bond with the coating layer to prevent movement of covering 21. This may provide additional material-to-material bonds in order to effect a leak proof arrangement. In a second embodiment, covering 21 may be a tightly wound braid where the underlying polymer does not flow through the interstitial areas. In this configuration, the overmolded component 16 may be directly overmolded onto the coating layer. If the coating layer and the overmolded component are miscible polymers, then a material-to-material bond may be formed to effectuate a leak proof seal.

Figure 7:
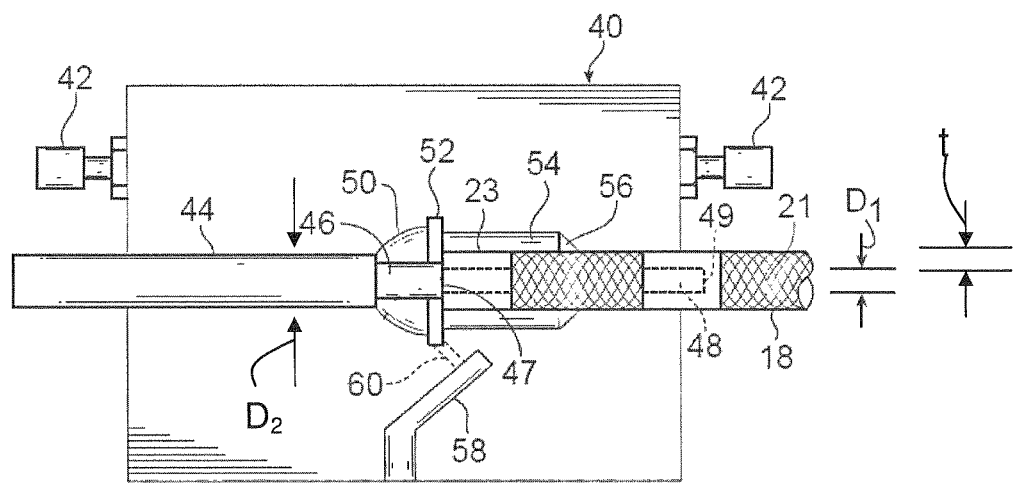
FIG. 7 is a top view of one half of a mold used in the process of overmolding the plastic tube showing the profile and covering partially inserted over the mandrel in the mold with a portion of the covering from profile removed to allow for bonding engagement between the exterior of the profile and the overmolded component.
Figure 8:
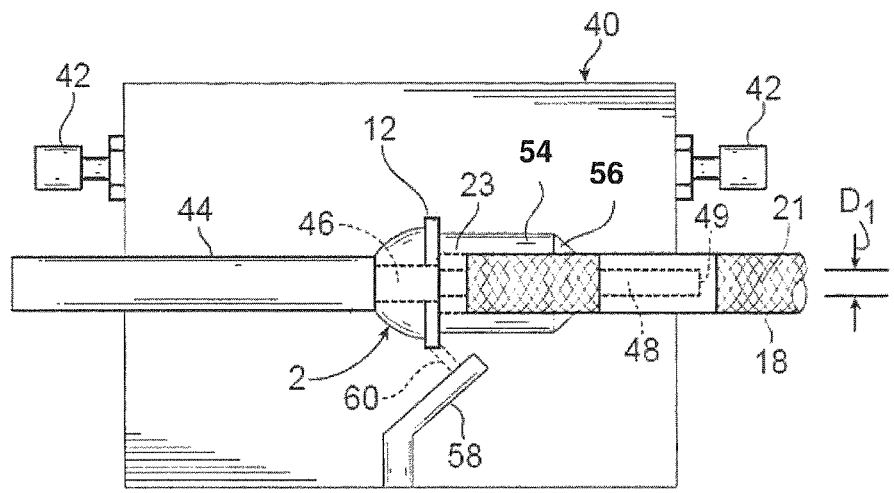
FIG. 8 is a view similar to FIG. 7 showing the profile and covering fully inserted over the mandrel in the mold with exposed underlying profile.

After the bonding region 23 of the plastic tube is exposed, the overmolding process may proceed. FIGS. 7-8 show one half of a mold 40 which would be effective in the overmolding process after the plastic tube is provided with the material-to-material bonding region 23. The mold 40 comprises a mandrel 44 having one or more extending portions 46, 48 and terminating at a point outside the mold 40. It is not necessary that the mandrel extending portion 48 have two different diameters as shown in FIG. 8, although this is preferred. At least a portion of the extending mandrel 49 will have an outer diameter which essentially matches the inner diameter of the plastic tube, to permit the insertion of the tube 18 onto the extending portion 48 of the mandrel 44. When the end use application requires the formation of a sealing surface on the overmolded component 16, the mold may have a radiused or a conical base 50 which may form the sealing surface of the nose cone terminating in a mold shelf recess 52. The cylindrical mold portion 54 extends from this shelf recess 52 and terminates in the radiused mold portion 56. The overmolding feed conduit 58 may be used to transfer flowable polymer from a source (not shown) into the mold 40 via a transfer conduit 60 shown in FIGS. 7 and 8 to be at the location of a mold shelf recess 52, although there is no reason to limit the location to this point, other entry points being satisfactory depending upon design criterion. The connectors 42 are used for heating and optionally cooling of the mold.

FIG. 7 shows the positioning of the plastic tube onto the extending portion 48 of the mandrel 44 terminating at the terminal shelf 47 of the first larger extending portion 46 of the mandrel 44 while FIG. 8 shows the product after the overmolding process has been completed. It should be recognized that the precise location of the first terminal shelf 47 of the first extending portion 46 of the mandrel 44 need not coincide with the location of a nose cone shelf 12, although it often will be in the vicinity thereof. In some instances, the extending mandrel portion will only be the second smaller diametered section, and the first extending portion 46 will be eliminated completely.

In operation, the mold cycle times and temperatures used will be dependent upon the composition of the materials used and the geometry of the part(s) being molded as well as the degree of dimensional control required for the molded product. It is possible to have a cycle time range from five seconds to several minutes depending on the curing time for the molded material. In general for crosslinkable polyethylene tubing, the temperatures used will range from 350° F. melt up to 540° F., although similar operations variables which were discussed for the mold cycle time are equally applicable here.

Molding pressure will also be subject to similar considerations, and for crosslinkable polyethylene, can range from 200 psi to 2,000 psi (hydraulic). In general, the colder the melt, the higher the pressure which is required to fill and pack the mold. If the part which is to be molded has a very thick section, then it may be desirable to use a low melt temperature and high melt pressure. Given the interactivity between the above variables in an injection molding process, the range of the processing variables is almost limitless within broad guidelines and within the skill of those in the art.

In FIGS. 1 through 6, tubing assembly discussed previously is illustrated showing embodiments of a tubing assembly of the present invention. In a preferred embodiment, crosslinkable polyethylene, is a preferred material, but other materials possessing the required properties may allow practice of the present invention. For example, it may be possible to obtain the inventive effect with polypropylene. The polymeric material may be extruded into tubes while in an uncrosslinked condition, during which it acts as a thermoplastic. The extruded profile 18 may be formed into shapes and then crosslinked, using a variety of known crosslinking techniques, to permanently set the shapes into the polymeric tube, which retains a sufficient amount of elasticity to be deformably compressed between a crimp ring and an insert to provide a leak-free seal. The polymeric material may also be injection molded from a melt in an effectively uncrosslinked condition in conventional molding equipment to impart a shape to the connector formed, which is then permanently set by crosslinking, again by conventional techniques. By "effectively uncrosslinked", we recognize that the very act of molding the material will result in some small amount of crosslinking, but that the final and critical crosslinking occurs after the material has been formed into the final desired shape. Additional aspects of the preferred embodiment of the invention may be imparted to the connector being formed during the shaping process, as will be discussed in more detail below.

Figure 2:
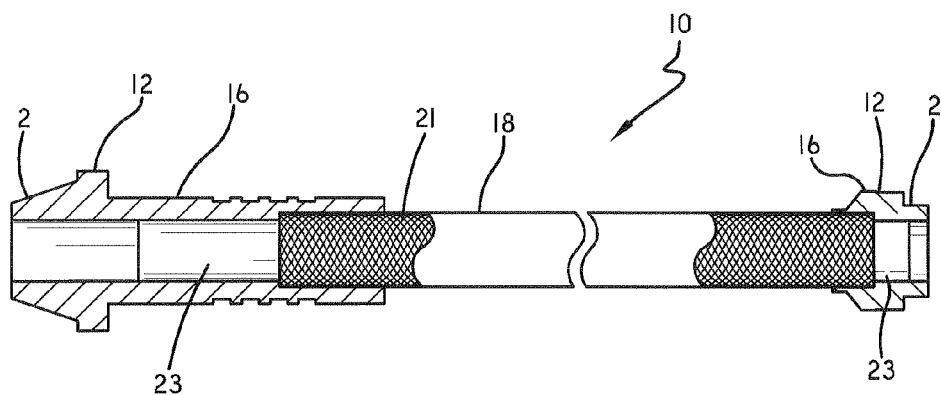
FIG. 2 is a partial cross-section view of the tube assembly having a covering wound and affixed thereabout, and an overmolded component on the ends of the profile.
Figure 3:
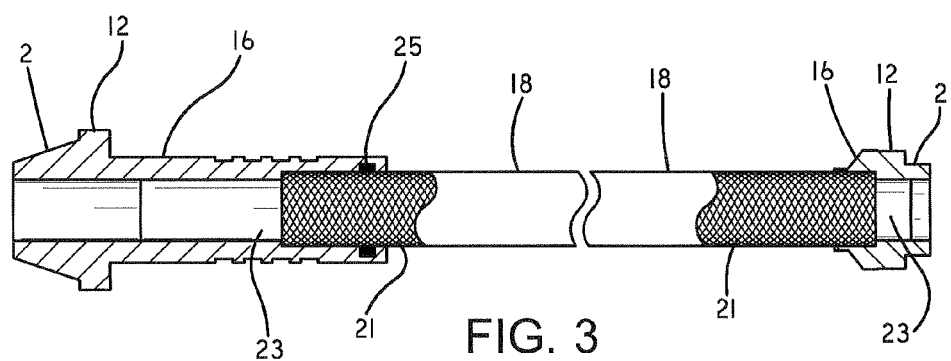
FIG. 3 is a partial cross-section view of a plastic tube having a covering wound and affixed thereabout, and an overmolded component on one end of the profile, each end of the braid additionally being secured about the profile by a crimp ring.

As shown in FIGS. 2 and 3, overmolded component 16 may have a front face 14, and a conical or radiused sealing surface 2 which terminates at a shelf 12. A portion of the inner surface of cylindrical rear surface is used to affix the nose cone in a leak-proof manner to the corresponding section of the outer surface of the tubing segment. The radiused sealing surface in conjunction with a portion of the cylindrical rear surface is used to fasten covering 21 about tube 18. When sealing surface is overmolded and used to anchor overmolded component 16, the overmolded component has an inner diameter $D_2$ which essentially matches outer diameter of tube 18. The inner diameter $D_1$ of tube 18 may be smaller than that of $D_2$ by a thickness t of tube 18 as illustrated in FIG. 7. A nut having a plurality of threads (not shown) may be used to effect sealing engagement with a mating orifice. In yet another embodiment of the invention, the connector may have at least one ridge and an O-ring molded into the connector to retain an appropriately sized nut.

Tubing assembly 10 may have its profile 18 of a first rigidity and a first flexibility and overmolded component 16 of a second rigidity and a second flexibility. In one embodiment of the invention, the first rigidity may be harder than the second rigidity and the first flexibility may be less than the second flexibility, i.e., the overmolded component may be "softer" and more "flexible" than tube 18. In a second embodiment of this invention, the relationship may be the inverse of that described for the first embodiment, the first rigidity may be softer than the second rigidity and the first flexibility may be greater than the second flexibility, i.e., the overmolded component may be "harder" and less "flexible" than tube 18. This second embodiment configuration is preferred when higher pressures may be encountered in the application and when maximum flexibility of the overmolded component is required. In yet a third embodiment of this invention, the rigidity of the overmolded component and tube 18 may be essentially the same. In discussing the above terminology, it should be recognized that while there are no definite boundaries of the term definitions, what is important are the relative physical parameters with respect of one component to the other. In general, "soft" durometers are as low as 40 durometer Shore A and "rigid" durometers could be as high as 80 durometer Shore D. Phrased in a slightly different manner, rigid would be most similar to hard thermoset plastics whereas flexible would be most similar to rubbery thermoplastics.

The leak-proof engagement of the covering 21 with tube 18 is effected by a process known to those skilled in the art as overmolding. In the first embodiment of this invention, the application which uses a rigid tube and a flexible overmolded component, a low density polyethylene component is molded over a polyethylene tube, for example a high density polyethylene tube, prior to the step of crosslinking. In this manner, it is possible to obtain the material-to-material bond, which may thereby effect the leak-proof attachment of the covering 21 to profile 18. The resulting component is crosslinked by means known in the art, for example, silane crosslinking, or radiation crosslinking, whereas radiation is the preferred method in the present invention. In a variation of this process, it is possible to begin with material which is partially crosslinked before the overmolding process, then perform additional crosslinking subsequent to the leak-proof attachment. The benefit of this embodiment is that covering 21 and profile 18 create a leak proof sealing surface.

What has been described above, is a process for overmolding tubes which comprises the steps of inserting tube 18 of a first polymer having an inner diameter at least partially into a mold 40 and at least partially onto a cylindrical mandrel, the mandrel having a base and a tip, an outer diameter of said mandrel dimensioned to allow the inner diameter of the tube 18 to slide thereon and forming in one embodiment, a sealing surface thereupon. The mold, which is a split mold, will contain by necessity, a void which comprises a sealing surface region 22 at a base of the mandrel and tube 18 contacting region adjacent sealing surface region 22. A second polymer is injection molded over the first polymer tube and the mandrel in the void of the mold and the polymers are crosslinked by using any of the crosslinking methodologies well known in the art.

While the precise composition of the polymer used in any of the components of the invention is not limited to any one composition or specified polymer, and in fact, the polymer can be a thermoplastic or a thermoset. In the practice of this invention, illustrative and non-limiting examples of the polymers which may be used in various combinations would include: polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

As used in this application, injection overmolding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold, and a clamp to hold the mold shut against injection pressures and for parts removal. The injection unit melts the plastic before it is injected into the mold, then injects the melt with controlled pressure and rate into the mold. When the mold closes, the prefill valve shifts to close the opening to the reservoir. The area behind the main ram is then pressurized. After the injection cycle, the prefill valve opens to allow the clamp to gently open the mold halves.

Factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

When thermoplastics are heated in an injection press, they soften and as pressure is applied, flow from the nozzle of the press into an injection mold. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

While the precise composition of the tubes or profiles and overmolded polymer are not required to be of any specified polymer, in general, there are several guidelines which are applicable in the practice of this invention. It is of course, recognized that the precise operating conditions utilized in the overmolding process are well-known in the art and are specific to each injection molded polymer. It is well within the skill of the art to determine the applicable conditions which will result in the appropriate overmolded polymer and plastic waterway. The degree of flexibility of the plastic conduit is not of particular relevance for this invention. The plastic waterway can be a thermoplastic or a thermoset. At least one aspect of the invention is that the overmolded polymer must be capable of forming a leak-proof bond, either chemical or physical, with the plastic of the conduit.

In the practice of this invention, illustrative and non-limiting examples of the polymers which may be used in various combinations to form the plastic conduit as well as polymers which may be used in the overmolding process would include: polyacetals, typically highly crystalline linear thermoplastic polymers of oxymethylene units; poly(meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyimide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

In a preferred embodiment, the polymers for both the conduit and overmolded polymer will be high density polyethylene which is subsequently crosslinked, preferably by the application of an electron beam, although other modes of crosslinking are envisioned to be within the scope of this invention.

While thermoplastic material can chemically bond to itself, as the percentage of crosslinking increases, there is less thermoplastic remaining to form this chemical bond. Therefore, without being limited to any one theory of operation, it is believed that one of the keys is the recognition of the need to form overmolded components at the earliest time when they are the least crosslinked. When crosslinking using radiation, this is before any crosslinking occurs. With silane crosslinking, this is typically after extrusion, but before crosslinking is complete.

The combination of the above polymers must satisfy at least two simultaneous conditions. First, the plastic conduit must not soften and begin melt flow to the point where it looses structural integrity and second, the overmolded polymer must be capable of forming an essentially leak-proof interface with the plastic conduit, preferably through either a chemical and/or physical bond between the underlying plastic and the overmolded plastic. One of the keys is the recognition that the plastic conduit must be capable of maintaining structural integrity during the overmolding conditions during which the overmolded polymer is in melt flow.

While using polymer compositions which have differing softening points is one way to achieve the above objective, there are alternatives, which would include the use of two compositions which have the same softening point, but which are of different thicknesses, thereby through the manipulation of the time, temperature and pressure conditions experienced during the molding operation, the plastic conduit would not experience melt flow, even though it had a similar softening point or range. It is also possible that through the incorporation of various additives in the polymeric compositions, e.g., glass fibers, heat stabilizers, anti-oxidants, plasticizers, etc., that the softening temperatures of the polymers may be controlled.

In a preferred embodiment of the invention, the composition of the overmolded polymer will be such that it will be capable of at least some melt fusion with the composition of the plastic conduit, thereby maximizing the leak-proof characteristics of the interface between the plastic conduit and overmolded plastic. There are several means by which this may be achieved. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

In yet another embodiment, composites of rubber/thermoplastic blends are useful in adhering to thermoplastic materials used in the plastic conduit. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic conduit. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer comprises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is believed, without being held to any one theory of operation or mechanism, that the leak-proof aspect of this linkage utilizes a phenomenon typically used in the formation of moisture-proof electrical connections, i.e., dynamic vulcanization shrink wrap. In this manner, the overmolded polymer is formed having internally latent stresses which upon the application of heat permit the relaxation of the stresses with resulting contraction of various polymeric strands within the composition during cooling.

In one specific embodiment of this invention which meets the above criteria, the plastic conduit will be polypropylene and the overmolded polymer is SANTOPRENE® thermoplastic elastomer by Advanced Elastomer Systems having a Shore A durometer of approximately 73. Due to the fact that the SANTOPRENE® polymer is an ethylene-propylene copolymer, the melt fusion of at least a portion of the polypropylene with at least the propylene portion of the SANTOPRENE® will be effected.

The best mode for carrying out the invention has been described for the purposes of illustrating the best mode known to the applicant at the time. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for securing a covering about a profile, said profile having a first and a second end, comprising the steps of:
   cutting a length of said profile;
   positioning a covering about said profile, said covering only co-extending partway along said length of said profile and a distance from said first end of said profile creating a first bonding region;
   heating said covering at an end of said covering adjacent said first bonding region to hold said covering in position on said profile prior to overmolding; and
   overmolding a thermoplastic polymer about a complete peripheral perimeter of said first bonding region of said profile that is chemically compatible with said profile so as to form a material-to-material leak-proof bond between said overmolded polymer and said profile, and extending the overmold about at least a portion of a peripheral perimeter of said covering.

2. The process of claim 1 wherein said covering and said overmolded thermoplastic polymer are only partially chemically compatible, said process further comprising the steps of:
   inserting a supplemental fastening means about an end of said covering;
   apply an inward compressive force to said supplemental fastening means; and
   said step of overmolding includes overmolding over at least a portion of said supplemental fastening means.

3. The process of claim 1 wherein
   said step of overmolding produces a sealing means; and wherein
   said overmolded thermoplastic polymer and said profile and said covering are all chemically compatible.

4. The process of claim 1 wherein
   said covering is a corrugated tube; and
   said step of overmolding produces a sealing end, said sealing end comprising a sealing surface.

5. The process of claim 1 which further comprises the step of crosslinking said overmolded polymer and said profile after said step of overmolding.

6. The process of claim 1 wherein
   said covering is co-extending partway along said length of said profile to a distance from said second end of said profile creating a second bonding region, the process further comprising the steps of
   overmolding a thermoplastic polymer about a complete peripheral perimeter of said second bonding region of said profile that is chemically compatible with said profile so as to form a material-to-material leak-proof bond between said overmolded polymer and said profile, and extending the overmold about at least a portion of a peripheral perimeter of said covering.

7. The process of claim 6 which, prior to the step of overmolding, further comprises the step of heating said covering at a second end of said covering adjacent said second bonding region to hold said covering in position on said profile prior to overmolding.

8. The process of claim 6 wherein said covering and said overmolded thermoplastic polymer are only partially chemically compatible, said process further comprising the steps of:
inserting a supplemental fastening means about a second end of said covering;
applying an inward compressive force to said supplemental fastening means; and
said step of overmolding includes overmolding at least a portion of said supplemental fastening means.

9. The process of claim 6 wherein
said step of overmolding about said second bonding region produces a sealing means; and wherein
said overmolded thermoplastic polymer about said second bonding region and said profile and said covering are all chemically compatible.

10. The process of claim 6 which further comprises the step of crosslinking said overmolded polymer and said profile after said step of overmolding about said second bonding region.

11. A process for securing a covering about a profile, said profile having a first and a second end, comprising the steps of:
cutting a length of said profile;
positioning a covering about said profile, said covering only co-extending partway along said length of said profile and a distance from said first end of said profile creating a first bonding region;
heating said covering at an end of said covering adjacent said first bonding region to hold said covering in position on said profile prior to overmolding; and
overmolding a first thermoplastic polymer about a complete peripheral perimeter of said first bonding region of said profile that is chemically compatible with said profile so as to form a material-to-material leak-proof bond between said overmolded polymer and said profile; and
overmolding a second thermoplastic polymer about at least a portion of a peripheral perimeter of said covering adjacent said first bonding region.

12. The process of claim 11 wherein
said first and second thermoplastic polymers are the same.

13. The process of claim 11 wherein
said first and second thermoplastic polymers are different.

14. The process of claim 11 which further comprises the step of crosslinking after said steps of overmolding said first and second thermoplastic polymers.

15. The process of claim 11 wherein
said covering is co-extending partway along said length of said profile to a distance from said second end of said profile creating a second bonding region, the process further comprising the steps of
overmolding said first thermoplastic polymer about a complete peripheral perimeter of said second bonding region of said profile that is chemically compatible with said profile so as to form a material-to-material leak-proof bond between said overmolded first polymer and said profile; and
overmolding said second thermoplastic polymer about at least a portion of a peripheral perimeter of said covering adjacent said second bonding region.

16. The process of claim 15 which, prior to the step of overmolding, further comprises the step of
heating said covering at a second end of said covering adjacent said second bonding region to hold said covering in position on said profile prior to overmolding.

17. The process of claim 15 wherein
said first and second thermoplastic polymers are the same.

18. The process of claim 15 which further comprises the step of
crosslinking said overmolded polymer and said profile after said step of overmolding said first and second polymers about said second bonding region.

* * * * *